UNITED STATES PATENT OFFICE.

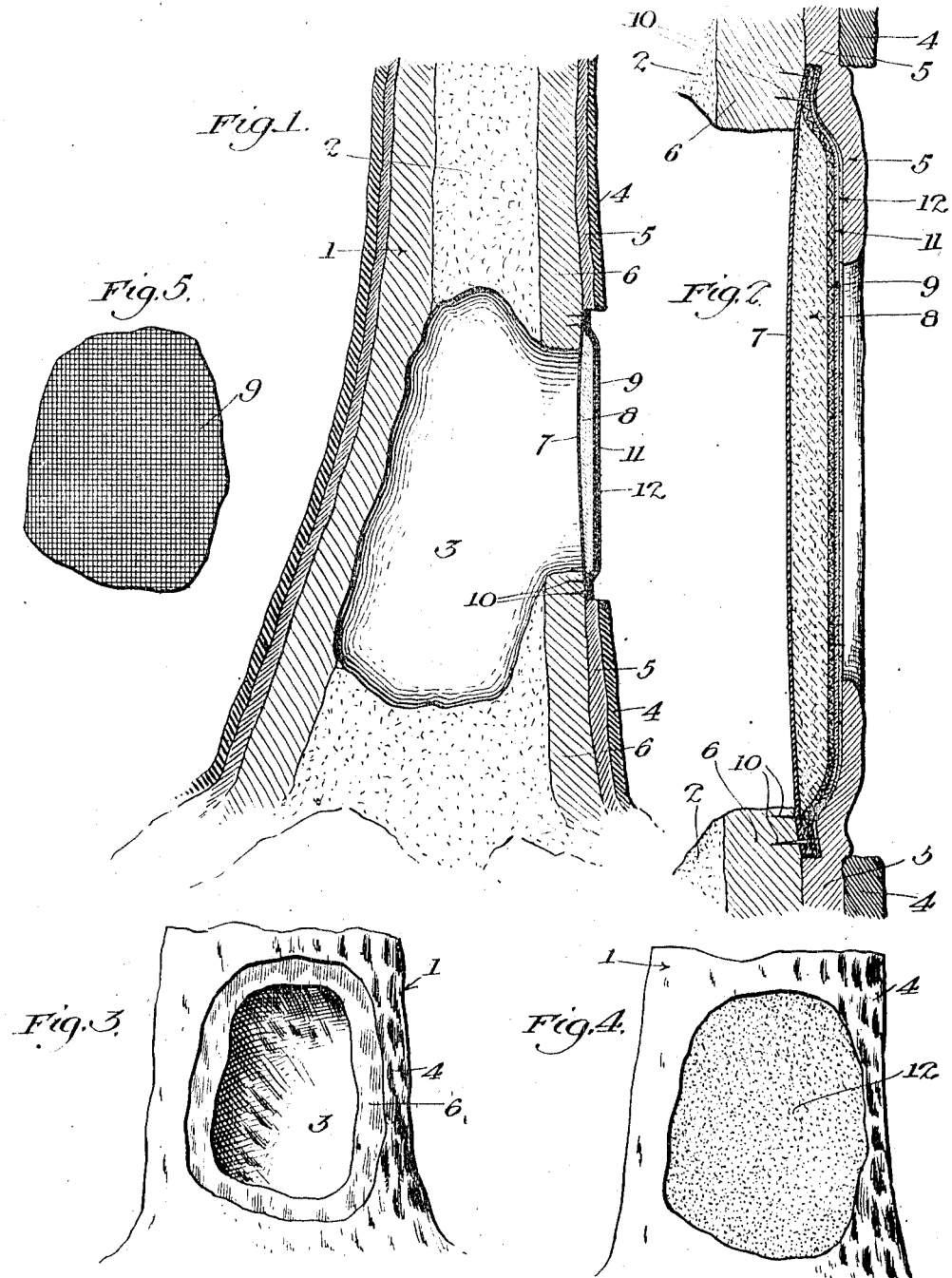

ROGER B. SHERMAN, OF PASADENA, CALIFORNIA.

TREE SURGERY.

1,080,660.  Specification of Letters Patent.  Patented Dec. 9, 1913.

Application filed March 10, 1913. Serial No. 753,431.

*To all whom it may concern:*

Be it known that I, ROGER B. SHERMAN, a citizen of the United States, residing at Pasadena, in the county of Los Angeles and State of California, have invented new and useful Improvements in Tree Surgery, of which the following is a specification.

Heretofore in tree surgery it has been customary to remove the decayed wood from the interior of the tree and fill the cavity with some substance such as concrete. This method, however, often requires large quantities of concrete or other filler where the cavities are large, and the cost is considerable. Another disadvantage of this method is that the tree when blown by the wind in a direction away from the side in which the opening is, opens a crevice around the concrete which fills the opening and this crevice permits the entrance of moisture and decay soon follows.

It is the object of the present invention to avoid both of these objectionable features, and to that end I provide a closure for the opening in the tree, which closure is sufficiently flexible to harmonize with the natural movements of the tree without causing any rupture at the joint between the closure and the tree. By making a perfect closure and firmly and permanently securing the same in position, I avoid the use or necessity of any filler for the interior.

Referring to the drawings: Figure 1 is a vertical section through a tree which has been remedied with my invention. Fig. 2 is an enlarged sectional view of the closure means, showing the adjacent portions of the tree. Fig. 3 is a front elevation of the tree after having been prepared for the application of the closure means. Fig. 4 is a view similar to Fig. 3, after the closure means has been applied. Fig. 5 is a plan view of the mat.

1 designates the tree, the heart 2 of which has a decayed portion 3. The first step in the method is to remove all decayed wood, and I then apply an antiseptic solution to the surfaces. I then remove the bark 4 and cambium 5 for a short distance around the opening to form an exposed margin around the sap wood 6. I then secure a mat consisting of a sheet of felt 7 over which is applied a compound 8, and over the compound is a steel wire mesh 9, the mat being secured by nails 10, and the compound being held between the mesh and felt. I first cut out a piece of felt to fit the space and lay a piece of mesh of the same shape on it, and then place the compound on the mesh and work it through to form the required thickness and then nail the mat thus formed into place. I next apply a relatively thin coating of compound 11 over the mesh 9 and over the surface of the compound 11, I apply sand 12 as a finish. The closure thus formed perfectly seals the cavity and is flexible, yielding with the movements of the tree. The closure means being secured by the nails to the sap wood, is prevented from becoming loose and the cambium and bark soon start a growth over the edges of the closure, as clearly shown in Fig. 2, which forms a perfect seal in a short time.

What I claim is:

1. The method of tree surgery which consists of removing the decayed wood from the tree and then placing a covering over the mouth of the cavity thus formed and sealing the edges of the covering to exclude moisture.

2. The method of tree surgery which consists of removing the decayed portion from the interior and removing the bark and cambium to expose the sap wood around the edge of the opening, and then securing a flexible seal directly to the sap wood to facilitate the growth of the cambium and bark over the edges of the seal.

In testimony whereof, I have hereunto set my hand at Los Angeles, California, this 19th day of June, 1912.

ROGER B. SHERMAN.

In presence of—
 GEORGE T. HACKLEY,
 MARTHA M. LANGE.